(12) United States Patent
Raffel et al.

(10) Patent No.: US 9,356,505 B2
(45) Date of Patent: May 31, 2016

(54) POWER CONSUMPTION MANAGEMENT OF A SWITCHING VOLTAGE REGULATOR

(75) Inventors: Harald Raffel, Nuremberg (DE); Peter Ott, Nuremberg (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/002,492

(22) PCT Filed: Mar. 2, 2011

(86) PCT No.: PCT/EP2011/053070
§ 371 (c)(1),
(2), (4) Date: Aug. 30, 2013

(87) PCT Pub. No.: WO2012/116740
PCT Pub. Date: Sep. 7, 2012

(65) Prior Publication Data
US 2013/0335044 A1    Dec. 19, 2013

(51) Int. Cl.
*H02M 1/00* (2007.01)
*H02M 3/02* (2006.01)
*H02M 3/156* (2006.01)

(52) U.S. Cl.
CPC ............... *H02M 3/02* (2013.01); *H02M 3/156* (2013.01); *H02M 2001/0032* (2013.01)

(58) Field of Classification Search
CPC ............. H02M 2001/0032; H02M 3/156; H02M 3/158; H02M 3/588; H02M 2001/0007; H02M 2001/0045; G05F 1/575; G05F 1/56
USPC ......... 323/223, 224, 225, 265, 266, 268, 273, 323/274, 282, 284
See application file for complete search history.

(56) References Cited

U.S. PATENT DOCUMENTS

| | | | | |
|---|---|---|---|---|
| 7,560,898 B1* | 7/2009 | Kranzen | ............... | H02J 7/0055 320/107 |
| 7,863,865 B2* | 1/2011 | Hussain | ............... | H02J 7/0055 320/138 |
| 8,810,214 B2* | 8/2014 | Van Dijk | ............... | H02M 3/158 323/266 |
| 8,836,166 B2* | 9/2014 | Maher | ................... | H02H 1/06 307/104 |
| 2003/0067287 A1* | 4/2003 | Morgen | ................. | G05F 1/465 323/273 |
| 2005/0242792 A1* | 11/2005 | Zinn | .................... | H02M 3/158 323/268 |
| 2007/0222415 A1* | 9/2007 | Shah | .................... | H02J 9/061 320/107 |
| 2008/0158918 A1* | 7/2008 | Hunter | ................... | G06F 1/26 363/49 |

OTHER PUBLICATIONS

Universal Serial Bus Specification, "Universal Serial Bus Specification Revision 2.0", Compaq, Hewlett-Packard, Intel, Lucent, Microsoft, NEC, Phillips, Revision 2.0, Apr. 2000, 650 pages.

* cited by examiner

*Primary Examiner* — Jue Zhang
*Assistant Examiner* — Lakaisha Jackson
(74) *Attorney, Agent, or Firm* — Patent Portfolio Builders, PLLC

(57) ABSTRACT

A power supply circuit (106) for a switching voltage regulator (108) connectable to a load (110) is described. In order to manage a power consumption of the switching voltage regulator (108) and in particular to minimize a power consumption of the switching voltage regulator when being operative, the power supply circuit (106) is configured for selectively supplying the switching voltage regulator (108) with one of a first input voltage and a second input voltage in response to a control signal indicative of an operative state of the load (110) such that the switching voltage regulator (108) is switched between a working state in response to the first input voltage and a standby state in response to the second input voltage.

12 Claims, 2 Drawing Sheets

POWER CONSUMPTION MANAGEMENT OF A SWITCHING VOLTAGE REGULATOR

CROSS REFERENCE TO RELATED APPLICATION(S)

This application is a 35 U.S.C. §371 National Phase Entry Application from PCT/EP2011/053070, filed Mar. 2, 2011, the disclosure of which is incorporated by reference in its entirety.

TECHNICAL FIELD

The invention relates to power consumption management using a switching voltage regulator, and in particular to a power supply circuit for a switching voltage regulator connectable to a load, a power consumption management circuit for managing a power consumption of a switching voltage regulator connectable to a load, a powered device, and a method of managing a power consumption of a switching voltage regulator connectable to a load.

BACKGROUND

A powered device may be connectable to a power source during its operation such that a source voltage is suppliable to electronic components of the powered device. In a case in which a value of the source voltage for the powered device is higher than a value of the maximum allowable supply voltage for the electronic components, the powered device comprises a power limiting device configured for limiting, particularly down converting, the value of the source voltage to the value below the maximum allowable supply voltage for the electronic components of the powered device.

For example, such a powered device may be a Long Term Evolution (LTE)-Universal Serial Bus (USB)-modem and may be connectable to a personal computer comprising the power source for the modem. A connection between the modem and the power source may be accomplished via a USB socket-plug-connection during a time in which the modem comprises its operative state. The value of the source voltage may be set according to the USB standard of the personal computer, and may be between 4.75 Volt (V) and 5.25 V. Further, the electronic components of the modem may comprise a base band chip configured for communicatively coupling the powered device with a respective communications network. The base band chip may comprise a value of a maximum allowable supply voltage between 3.0 V and 4.6 V. Accordingly, the modem comprises a power limiting device configured as a buck regulator which is configured for down converting the value of the source voltage to the value below the maximum allowable supply voltage for the base band chip.

Usually, such a powered device may be optimized towards its required source voltage when being operative, in order to save energy for reasons of environmental protection. In particular, in a case in which the power source is configured as or may be comprised in a battery operated device (for example a mobile phone, a personal computer, a laptop, a tablet, a netbook, etc.), optimizing the powered device towards its required source voltage may help to minimize an amount of recharging cycles of the battery of the battery operated device.

Referring to the above described example, a power consumption of the modem may be subject to regulations both for its working state and its standby state. In the case of the above described LTE-USB-modem, an overall power consumption of the modem being in its standby state shall be as low as possible. Further, the USB specification may limit the overall power consumption to a certain value, for example, at most 2.5 milliampere (mA) for a USB 2.0 standard.

However, in the standby state of the modem, the internal power consumption of the buck regulator is already between about 10 mA and about 30 mA. The particular value of the power consumption of the buck regulator depends on an internal architecture of the buck regulator which may differ between different vendors of the buck regulator. The above stated values of the internal power consumption of buck regulator do not account for a required additional supply current for the load being in its standby state, which supply current has to be supplied by the buck-regulator as well. Accordingly, theses power consumption values are incompatible with the desired (overall) power consumption of the modem of about 2.5 mA.

SUMMARY

It is an object of the present invention to provide a power consumption management for a switching voltage regulator which may allow for a low power consumption of the switching voltage regulator, particularly in a case in which a powered device comprising (or associated to) the switching voltage regulator may be in a reduced operative mode, e.g. a standby state.

According to an exemplary aspect of the invention, a power supply circuit for a switching voltage regulator is provided. The switching voltage regulator is connectable to a load. The power supply circuit is configured for selectively supplying the switching voltage regulator with one of a first input voltage and a second input voltage in response to a control signal indicative of an operative state of the load such that the switching voltage regulator is switched between a working state in response to the first input voltage and a standby state in response to the second input voltage.

According to another exemplary aspect of the invention, a power consumption management circuit for managing a power consumption of a switching voltage regulator is provided. The switching voltage regulator is connectable to a load. The power consumption management circuit comprises a power supply circuit as described above. The power consumption management circuit comprises the switching voltage regulator connected to the power supply circuit and configured for being switchable between a working state in response to a first input voltage suppliable by the power supply circuit and a standby state in response to the second input voltage suppliable by the power supply circuit.

According to another exemplary aspect of the invention, a powered device is provided. The powered device comprises a power consumption management circuit as described above, and a load connected to a switching voltage regulator of the power consumption management circuit.

According to another exemplary aspect of the invention, a method of managing a power consumption of a switching voltage regulator connectable to a load is provided. The method comprises supplying a control signal to a power supply circuit as described above. The control signal is indicative of an operative state of a load (e.g. a baseband circuit of a mobile terminal). The method comprises selectively supplying the switching voltage regulator with one of a first input voltage supplied by the power supply circuit and a second input voltage supplied by the power supply circuit in response to the control signal. The method comprises switching the switching voltage regulator between a working state in response to the first input voltage and a standby state in response to the second input voltage.

In the context of the present invention, the term "switching voltage regulator" may particularly denote an electronic component, which may be usable for regulating an input voltage of the switching voltage regulator by supplying an output voltage in a switching way. In particular, the output voltage of the switching voltage regulator may be outputted in a pulsed way. In particular, the switching voltage regulator may be configured for converting, particularly down converting or stepping down, (a value of) the input voltage to (a value of) the output voltage.

The term "operative state" of an electronic component may particularly denote a state or a mode of the component in which the component may be activated or enabled for its operation. In particular, in a case in which the component may comprise a load, the operative state of the component may depend on the operative state of a load of the component but may not depend on an operative state of a power supply for the component.

The term "working state" of an electronic component may particularly denote an operative state of the component in which the component may be activated and may be configured for executing its actual operation.

The term "standby state" or suspended state of an electronic component may particularly denote an operative state of the component in which only limited functions are performed, preferably (only) such functions allowing the component to be activated on command.

The term "the switching voltage regulator being selectively suppliable with a first input voltage and a second input voltage" may particularly denote that the switching voltage regulator may be suppliable with the first input voltage or (alternatively) with the second input voltage. In particular, a sequence of the selection may be selectable. In particular, the first and second input voltages may comprise different values. In particular, at least one of the values of the first and second input voltages may be different from a value of the output voltage of the switching voltage regulator.

The term "load" may particularly denote one electronic component or a plurality of electronic components. In particular, an operative state of the load may be determined by an operative state of the one electronic component when the load may comprise the one electronic component. In particular, an operative state of the load may be determined by an operative state of one of the plurality of electronic components, by more than one of the plurality of electronic components or by all of the plurality of electronic components when the load may comprise the plurality of electronic components. In particular, in the latter cases, remaining electronic components of the plurality of electronic components may be in non operative states or in another operative state(s) compared to the operative state of the determining electronic component(s).

The term "power consumption of the switching voltage regulator" may particularly denote an internal power consumption of the switching voltage regulator which may be determined by a required operating current of the switching voltage converter when being operative. In particular, the internal power consumption of the switching voltage regulator may not relate to a supply current for a connectable load to be operative.

The term "powered device" may particularly denote an electrically operable device.

According to the exemplary aspects of the invention, the switching voltage regulator may be switchable between two states, namely a working state and a standby state. The working state of the switching voltage regulator may be associated with a high power consumption of the switching voltage regulator, and the standby state of the switching voltage regulator may be associated with a low power consumption of the switching voltage regulator. These two operative states of the switching voltage regulator may be alternatively selectable in accordance with an operative state of a load connectable to the switching voltage regulator.

In particular, an effective power consumption management of the switching voltage regulator and thus of the powered device may be provided in that the switching voltage regulator may adapt or adjust, depending on the operative state of the load, its own operative state such that the switching voltage regulator may comprise a low or high power consumption. In particular, the power consumption of the switching voltage regulator may be minimized in accordance with the operative state of the load in that the switching voltage regulator may be switched into its standby state.

In particular, since the controlling of the switching voltage regulator may be based on the value of the input voltage of the switching voltage regulator, the power consumption management of the switching voltage regulator may be executed in an easy way.

In particular, since the switching voltage regulator may show a low power consumption in its standby state, the powered device may be activated despite not being used such that a reactivation of the powered device for its actual operation may be immediately possible.

Next, further exemplary embodiments of the power supply circuit for a switching voltage regulator connectable to a load will be explained. However, these embodiments also apply to the power consumption management circuit for managing a power consumption of a switching voltage regulator connectable to a load, the powered device, and the method of managing a power consumption of a switching voltage regulator connectable to a load.

The power supply circuit may further comprise a voltage converting element configured for converting an input voltage to an output voltage, wherein a value of the output voltage of the voltage converting element may be (approximately) equal to the second input voltage of the switching voltage regulator, and a bypass line arranged in parallel to the voltage converting element, wherein the voltage converting element and the bypass line may be selectively operative in response to the control signal. Thus, the power supply circuit may comprise two parallel branches for supplying a source voltage to the switching voltage regulator, wherein a branch may comprise the bypass line and the another branch may comprise the voltage converting element. Accordingly, the second input voltage for the switching voltage regulator may be generated by the voltage converting element such that the value of second input voltage may be easily adjustable to a desired value. In particular, this value may be lower than the value of the output voltage of the switching voltage regulator but may be still above a value of a minimum input voltage of the load which may be required by the load to be operative when being in its standby state. Further, the first input voltage of the switching voltage regulator may be equal to the voltage transferred via the bypass line, thereby facilitating the voltage supply for the switching voltage regulator.

In particular, the voltage converting element may be not switchable when being in an operative state but may be only switchable between its activated or operative state and its deactivated or non-operative state. In particular, the voltage converting element may be configured for down converting a value of its input voltage to a different one value of its output voltage. Thus, the voltage converting element may be configured for providing a timely constant supply voltage to the switching voltage regulator when being in its operative state such that the switching voltage regulator may be configured for being switched into its standby state over this time period.

The voltage converting element may be configured as a low-dropout regulator (LDO). Thus, a conventional and inexpensive electronic component may be usable for the voltage converting element, thereby decreasing the manufacturing and maintenance costs of the power supply circuit. In particular, activating a low dropout regulator may be accomplished by activating an output port of the low dropout regulator particularly via an enabling pin. In particular, since such a voltage converting element may comprise a low (internal) power consumption particularly in a range of micro Ampere ($\mu A$) when being operative or being non-operative, the power consumption of the power supply circuit and thus of the power consumption management circuit and the powered device may not be unnecessarily increased when being operative.

The power supply circuit may further comprise a switching element arranged in the bypass line, and a (particularly logic-based) controlling unit configured for controlling the switching element in response to the control signal. In particular, the switching element may be configured as a metal oxide semiconductor field effect transistor (MOSFET) (power) switch. In particular, in the latter case, the controlling unit may be configured for controlling a gate voltage of a gate of the MOSFET, and may be thus configured as a gate-controlling unit. Thus, the power supply circuit may comprise a simple measure for selecting the bypass line and the switching element to be operative or not operative. In particular, since a switching element may comprise a low resistance (particularly when being closed or switched) particularly in a range of milli Ohm ($m\omega$), the power consumption of the power supply circuit and thus of the power consumption management circuit and the powered device may not be unnecessarily increased when the switching element may be in its working state. In particular, since the switching element may comprise a leakage current in a range of nano Ampere (nA), the power consumption of the power supply circuit and thus of the power consumption management circuit and the powered device may not be unnecessarily increased when the switching element may be in its standby state. In particular, the controlling unit may comprise a power consumption in the range of nA or $\mu A$ such that the power consumption of the power supply circuit and thus of the power consumption management circuit and the powered device may not be unnecessarily increased when the switching element may be in its standby state.

In particular, the controlling unit may be switched off or to its non operative state in response to the control signal indicating the standby state of the load.

The power supply circuit may be connectable to a power source configured for supplying a source voltage, wherein a value of the source voltage may be (approximately) equal to a value of the first input voltage of the switching voltage regulator. In particular, the power supply circuit may be arrangeable between, particularly in series with, the power source and the switching voltage converter. In particular, the power supply circuit may be arranged downstream of the power source and upstream of the switching voltage regulator when seen along a current flow direction being defined from the power source towards the load. In particular, the power source may be configured as a direct current (DC) power source configured for supplying a DC source voltage. Accordingly, the source voltage may be suppliable to both of the bypass line and the voltage converting element, but may be suppliable to the switching voltage regulator only via one of the bypass line and the voltage converting element depending on the operative state of the switching element and the voltage converting element for enabling the selectively supply of the switching voltage regulator with one of the first input voltage and the second input voltage.

The operative state of the load may comprise a working state and a standby state, wherein the bypass line may be operative if the control signal may indicate that the load may be in the working state, and wherein the voltage converting element may be operative if the control signal may indicate that the load may be in the standby state. Thus, in a case in which the load may be in its working state, the source voltage supplied by the power source may be suppliable to the switching voltage converter. In particular, in a case in which the load may comprise its standby state, the output voltage of the voltage converting element may be suppliable to the switching voltage regulator for the switching of the switching voltage regulator to its and during its standby state. Thus, the power consumption management may be easily incorporatable into a powered device, since the switching voltage regulator may maintain its usual operation according to its working state by being connected to its power source but additionally being switchable into its standby state for having a low power consumption.

In particular, the control signal may comprise a high value if the load may be in its standby state, and the control signal may comprise a low value if the load may be in its working state. Alternatively, in particular, the control signal may comprise a high value if the load may be in its working state, and the control signal may comprise a low value if the load may be in its standby state. In particular, the latter may require a change of a polarity of the resistor in a control line, via which control line the control signal may be suppliable. In particular, a change of a polarity of the voltage converting element and the (gate-) controlling unit may be further required. Accordingly, the control signal may represent logic-based signal.

In particular, the control signal may be suppliable to the power supply circuit at a time when the switching voltage regulator may switch its state or from a time on when the switching voltage regulator may switch its state to a time when the switching voltage regulator may switch again its state.

In particular, the control line may be connected to (a component of) the load and/or to another (central) controlling module configured for controlling the operative state of the load.

In particular, the control signal may provide a feedback of the load particularly whether the load may be in its working state or in its standby state which state may particularly depend on a value of the output voltage of the switching voltage regulator. In particular, the control signal may be regarded as a feedback signal, and the control line may be regarded as a feedback line.

In particular, the power supply circuit may be (particularly manufactured as) an integrated circuit particularly on a common substrate. Thus, the power supply circuit may be usable in a versatile way for any load which may require different supply currents when being in its working state and in its standby state.

Next, further exemplary embodiments of the power consumption management circuit for managing a power consumption of a switching voltage regulator connectable to a load will be explained. However, these embodiments also apply to the power supply circuit for a switching voltage regulator connectable to a load, the powered device, and the method of managing a power consumption of a switching voltage regulator connectable to a load.

The switching voltage regulator may be configured for repetitively switching an input voltage to an output voltage, if a value of the input voltage of the switching voltage regulator may be above a threshold value, wherein a value of the output voltage of the switching voltage regulator may be (approximately) equal or below the threshold value. Thus, the operation of the switching voltage regulator may be based on repetitively switching the input voltage to the output voltage for the input voltage of the switching voltage regulator being above the threshold value and with the output voltage of the switching voltage regulator being down converted with respect to the threshold value and thus the input voltage of the switching voltage regulator.

In particular, the repetitively switching of the switching voltage regulator may be defined by a duty cycle of the switching voltage regulator. The term "duty cycle" may particularly denote a ratio between a time period in which the switching voltage regulator may switch on and a time period when the switching voltage regulator may switch off until a time when the switching voltage regulator may switch on again.

In particular, the threshold value may account for internal losses of the switching voltage regulator. In particular, the threshold value may be ideally equal to the value of the output voltage of the switching voltage regulator. In particular, the threshold value may be predefinable for the switching voltage regulator by taking into account a ratio between an input voltage of the switching voltage regulator and an output voltage of the switching voltage regulator in relation to a load connectable to the switching voltage regulator.

In particular, the switching voltage regulator may be configured as a buck regulator having a (preconfigured) output voltage of 3.4 V. In particular, the threshold value may be equal to the output voltage.

The working state of the switching voltage regulator may be associated with the switching voltage regulator being configured for repetitively switching an input voltage to an output voltage, and wherein the standby state of the switching voltage regulator may be associated with the switching voltage regulator being configured for through passing the input voltage (particularly to an output port) of the switching voltage regulator. Accordingly, the working state of the switching voltage regulator may be associated with a usual operational mode of the switching voltage regulator when comprising the duty cycle of below one or below 100 percent (%), and the standby state of the switching voltage regulator may be associated with the switching voltage regulator comprising the duty cycle of one or 100%. Accordingly, in the latter case the switching voltage regulator may not switch the input voltage to the output voltage but simply may through pass the input voltage to the output voltage. In particular, the standby state of the switching voltage regulator may be interpreted as a "quasi" standby state of the switching voltage regulator. Thus, the power consumption of the switching voltage regulator being in its standby state may be low, since the switching voltage regulator may be operative but may not execute its switching behavior.

A value of an output voltage of a voltage converting element of the power supply circuit may be below the threshold value such that the switching voltage regulator may be set into its standby state (corresponding to a duty cycle of one or 100%). Thus, the switching of the switching voltage regulator into its standby state may be easily accomplished, since the value of the output voltage may be set to a suitable value compared to the threshold value.

In particular, the switching voltage regulator may be configured for regulating the output voltage by repetitively switching on and off an input voltage of the switching voltage regulator, if a value of the input voltage is above a (particularly certain) threshold value, wherein the value of the first input voltage may be above the threshold value and the value of the second input voltage may be equal or below the threshold value. Here, the threshold value may be identical to the threshold value described above. Accordingly, in response to the value of the input voltage, the switching voltage regulator may be configured for operating in its working state or in its standby state as described above.

In particular the output voltage may be defined or controlled by the switching voltage regulator using pulse width modulation.

The power consumption management circuit may be (particularly manufactured as) an integrated circuit, whereby the power consumption management circuit may be easily handable by integrating the integrated circuit into a respective device, for example by electrically connecting a substrate of the integrated circuit to another device substrate of a powered device. Thus, the power consumption management circuit may be usable in a versatile way for different loads.

Next, further exemplary embodiments of the powered device will be explained. However, these embodiments also apply to the power supply circuit for a switching voltage regulator connectable to a load, the power consumption management circuit for managing a power consumption of a switching voltage regulator connectable to a load, and the method of managing a power consumption of a switching voltage regulator connectable to a load.

The powered device may be configured as a mobile telecommunications device and/or according to a Universal Serial Bus (USB) specification. In particular, the powered device may be configured as a modem, a hard disc, a (particularly passive ethernet) hub or a battery charger. In particular, the powered device may be configured for being communicatively coupled and/or may be configured as communication user equipment in accordance with Long Term Evolution (LTE), Wideband Code Division Multiple Access (WCDMA), Extended Global System for Mobile Communications (EGSM), Wireless Local Area Network (WLAN) or Worldwide Interoperability for Microwave Access (WiMax). In particular, the powered device may be configured as a LTE-USB-(dongle) modem.

BRIEF DESCRIPTION OF THE DRAWINGS

The invention will be described in more detail hereinafter with reference to examples of embodiment, but to which the invention is not limited.

DETAILED DESCRIPTION

Figure 1:
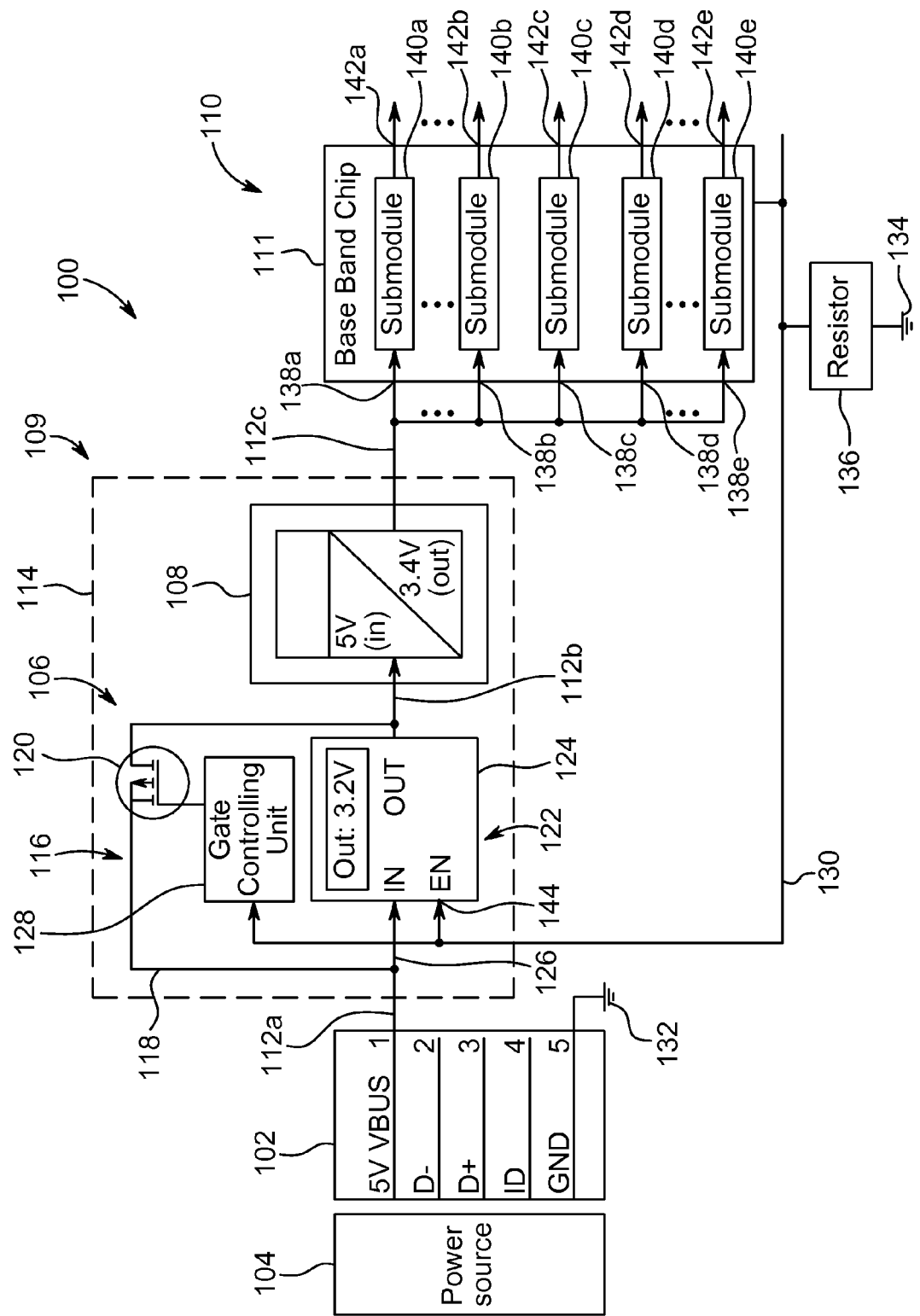
FIG. 1 is a block diagram illustrating a powered device according to an exemplary embodiment of the invention.

The illustration in the drawing is schematic. It is noted that in different figures, similar or identical elements are provided with the same reference signs or with reference signs which are different from the corresponding reference signs only within the first digit.

FIG. 1 illustrates a powered device 100 according to an exemplary embodiment of the invention. The powered device 100 is configured as a LTE-USB-modem, and is connectable to a personal computer via a USB plug 102 of the powered device 100. The personal computer comprises a power source 104 configured for supplying a direct current (DC) source voltage of 5.00 Volt (V) for the powered device 100. Alternatively, the source voltage may comprise a value between 4.75 V and 5.25 V (as is specified by the USB 2.0 standard). In order to enable a connection between the powered device 100 and the personal computer, the personal computer comprises a female USB socket element into which the male plug element 102 is pluggable.

The powered device 100 comprises a power supply circuit 106, a switching voltage regulator 108 configured as a buck regulator, and a load 110 which comprises an analog base band chip 111 and further electronic components. The plug element 104, the power supply circuit 106, the switching voltage regulator 108, and the load 110 are connected to one another in series via respective voltage lines 112a-c. The voltage line 112a interconnects the plug element 102 and the power supply circuit 106, the voltage line 112b interconnects the power supply circuit 106 and the switching voltage regulator 108, and the voltage line 112c interconnects the switching voltage regulator 108 and the load 110.

The power supply circuit 106 and the switching voltage regulator 108 form a power consumption management circuit 109 configured for managing the internal power consumption of the switching voltage regulator 108, in order to guarantee that a value of a power consumption of the powered device 100 is within a determined range when the powered device 100 and thus the load 110 are in its standby state. It is noted that the operative state of the load 110 is determined by the operative state of the base band chip 111 of the load 110, and the further electronic components of the load 110 comprise operative states being identical to the operative state of the base band chip 111 of the load 110. Alternatively, the further electronic components may be switched off, or may be in other operative states compared to the operative state of the base band chip 111.

The power supply circuit 106 and the switching voltage regulator 108 is configured as an integrated circuit, and are arranged on a common substrate 114 configured as a printed circuit board. The substrate 114 is indicated in FIG. 1 by a dashed line.

The power supply circuit 106 comprises a first branch 116 comprising a bypass line 118 in which a switching element 120 configured as a MOSFET is arranged. A second branch 122 of the power supply circuit 106 comprises a voltage converting element 124 configured as a low-dropout regulator (LDO). The voltage converting element 124 is configured for converting an input voltage to an output voltage, and is arranged in a voltage line 126 of the second branch 122 of the power supply circuit 106 which interconnects the voltage line 112a and the voltage line 112b to one another. Accordingly, the source voltage to be provided by the power source 104 is suppliable to the first and second branches 116, 122 of the power supply circuit 106 such that a value of the source voltage is equal to a value of the input voltage of the voltage converting element 124 and to a value of the voltage supplied by the bypass line 118 to the switching voltage regulator 108.

The power supply circuit 106 further comprises a gate-controlling unit 128 configured for controlling the switching element 120 in response to a control signal which is suppliable via a control line 130 to the gate-controlling unit 128. Further, the control line 130 is connected to the voltage converting element 124 such that the voltage converting element 124 is activatable and deactivatable in response to the control signal, and is configured for being set from its deactivated state to its activated or operative state and vice versa. The control line 130 starts at and is connected to the base band chip 111 and the further electronic components of the load 110. Alternatively, the control line 130 may start at and may be connected to a controlling module of the powered device which may be configured for controlling an operative state of the baseband chip 111 of the load 110 by setting the base band chip 111 and the further electronic component in their standby states.

The control signal indicates an operative state of the base band chip 111 of the load 110, namely a working state and a standby state, and comprises a high value if the base band chip 111 of the load 110 is in its standby state being associated with low internal power consumption, and comprises a low value if the base band chip 111 of the load 110 is in its working state being associated with by high internal power consumption. The gate-controlling unit 128 is configured for generating a gate control signal in response to the control signal such that the switching element 120 opens and closes. Accordingly, the switching element 120 and thus the bypass line 118 and the voltage converting element 124 are selectively operative in response to the control signal in that the bypass line 118 and the switching element 120 are operative if the control signal indicates that the base band chip 111 of the load 110 comprises its working state, and the voltage converting element 124 is operative if the control signal indicates that the base band chip 111 of the load 110 is in its standby state.

The switching voltage regulator 108 is configured for repetitively down converting an input voltage to an output voltage if a value of the input voltage of the switching voltage regulator 108 is above a threshold value being predefined by the switching voltage regulator 108. The threshold value is about 3.5 V but is higher than the minimum supply voltage of 3.0 V of the load 110 in the standby state V. However, the threshold value may be in the range of 3.0 V to 4.6 V. A respective value of the output voltage of the switching voltage regulator 108 is below the threshold value. Alternatively, the threshold value may be equal to the value of the output voltage of 3.4 V of the switching voltage regulator 108. Further, the value of the output voltage of the voltage converting element 124 is below the value of the threshold value (3.2 V versus 3.5 V). It is noted that the above presented voltage values are example values defined in association with the LTE-USB-dongle modem.

The switching voltage regulator 108 is suppliable by the power supply circuit 106 with first and second input voltages based on the operative states of the switching element 120 and thus the bypass line 118 and the voltage converting element 124. The first input voltage corresponds to the source voltage suppliable via the bypass line 118 and the switching element 120, and the second input voltage corresponds to the output voltage of the voltage converting element 124.

In order to adapt an internal power consumption of the switching voltage regulator 108, the switching voltage regulator 108 is configured for being switchable between its two operative states, namely the working state and the standby state, in response to the first and second input voltages. The working state of the switching voltage regulator 108 is associated with the switching voltage regulator 108 being configured for repetitively down converting its input voltage to a fixed output voltage with a particular duty cycle below one, and the standby state of the switching voltage regulator 108 is associated with the switching voltage regulator 108 being configured for passing through the input voltage of the switching voltage regulator 108 such that a value of its input voltage is identical to a value of its output voltage. In the shown embodiment, the standby state of the switching voltage regulator 108 is characterized by the second input voltage of 3.2 V and the second output voltage of 3.2 V. The passing through of the switching voltage regulator 108 is accomplished by a duty cycle of one or 100 percent corresponding to a permanently switched state of the switching voltage regulator 108.

Hence, the switching voltage regulator 108 is switchable in its working state in response to the first input voltage being suppliable by the power supply circuit 106, and is switchable to its standby state in response to the second input voltage being suppliable by the power supply circuit 106.

The USB plug 102 is connected to ground 132. This wiring is according to the USB standard 2.0.

Further, the control line 130 is connected to ground 134 via a resistor 136. Thus, during startup of the powered device 100, the switching voltage regulator 108 is configured for its working state. The base band chip 111 comprises a plurality of input ports 138*a-e* each of which being connected to the signal line 112*c* and in parallel to one another, a plurality of sub-modules 140*a-e*, and a plurality of output ports 142*a-e*. Each of the sub-modules 140*a-e* is connected to a respective one of the input ports 138*a-e* and to a respective one of the output ports 142*a-e*. The output ports 142*a-e* are connected to the further electronic components of the load 110.

In the following, an operation of the powered device 100 will be explained.

First, the powered device 100 is connected to the personal computer via the USB plug-socket connection between these two devices. Thus, the power source 104 comprised in the personal computer supplies the DC voltage of 5.00 V to the powered device 100.

The powered device 100 is then powered up in its working state (due to a polarity of the resistor 136 and a polarity of the voltage converting element 124 and a polarity of the gate-controlling unit 128 as well as the switching element 120), and the first branch 116 of the power supply circuit 106 is operative. Accordingly, the source voltage is supplied to the voltage line 112*b* and further to the switching voltage regulator 108 via the bypass line 118 and the closed switching element 120. The switching voltage regulator 108 repetitively switches on and off its inputted first input voltage, and repetitively down converts the first input voltage to the first output voltage, i.e. from a value of 5.00V to 3.4 V, and outputs its first output voltage in a pulsed way. The first output voltage is supplied via the signal line 112*c* to the load 110 and is inputted to the base band chip 111 via the input ports 138*a-e*. The input voltage is supplied to the respective sub-modules 140*a-e*, and is converted to respective output voltages outputted by the output ports 142*a-e* of the base band chip 111. Further, a control signal 130 is generated by the base band chip 111, and is supplied to the power supply circuit 106. The control signal comprises its low value. The gate-controlling unit 128 generates a respective control signal for the switching element 120 such that the switching element 120 remains in its closed state.

In the working state of the load 110, a power consumption of the powered device 100 is dominated by power consumption contributions of the elements of the powered device 100 set in their respective operative states. In the shown embodiment of the powered device 100, the internal power consumption of the powered device 100 is dominated by the efficiency of the switching voltage regulator 108 and the power consumption of the base band chip 111. In the shown embodiment, the switching voltage regulator 108 shows a power consumption between about 10 mA and about 30 mA. The voltage converting element 124 is switched off, and shows internal power consumption in the range of µA owing to parasitic currents within the voltage converting element 124, and thus does not contribute to the power consumption of the powered device 100. Further, the controlling unit 128 comprises a power consumption in the range of nA or µA which does not contribute to the power consumption of the powered device 100.

Next, the operative state of the base band chip 111 of the load 110 changes from its working state to its standby state. Accordingly, the base band chip 111 of the load 110 (or the controlling module of the powered device 100) instantly changes the control signal from the low value to high value which is supplied to the power supply circuit 106 via the control line 130. Further, the voltage converting element 124 is activated via its enable (EN) pin 144, and the gate-controlling unit 128 generates a respective gate control signal for the switching element 120 such that the switching element 120 opens. Accordingly, the source voltage is inputted to the voltage converting element 124 which down-converts the source voltage to the fixed value of the output voltage of 3.2 V. The output voltage is then supplied to the switching voltage regulator 108 via the voltage line 112*b*. Since the value of this second input voltage is below the threshold value of the switching voltage regulator 108, the switching voltage regulator 108 sets its duty cycle to one such that the repetitively switching of the switching voltage regulator 108 stops and the switching voltage regulator 108 passes through.

The input voltage with its value of 3.2 V is outputted by the switching voltage regulator 108 as its second output voltage, and is supplied to the load 110. This value of the second output voltage of the switching voltage regulator 108 still corresponds to the required value of the operating voltage for the load 110 when being in its standby state.

The power consumption of the powered device 100 is now decreased to a value of about 2.5 mA (which is in accordance to the USB 2.0 specification), and is dominated by the power consumption of the base band chip 111 and the internal power consumption of below about 1 mA of the switching voltage regulator 108. The internal power consumption of the voltage converting element 124 is in the range of µA and is thus neglectible in comparison to the power consumption of the switching voltage regulator 108 and the load 110. Further, the controlling unit 128 comprises a power consumption in the range of nA or µA which does not contribute to the power consumption of the powered device 100. Thus, setting the switching voltage regulator 108 in its standby state causes the powered device 100 to be compatible with standby current requirements according to the USB 2.0 standard and the current management requirements of the powered device 100 as the LTE-USB-modem.

Next, the operative state of the base band chip 111 of the load 110 changes from its standby state to its working state such that the powered device 100 is set to its working state again. Instantly, the base band chip 111 of the load 110 changes the control signal from the high value to the low value which is supplied to the power supply circuit 106 via the control line 130. The voltage converting element 124 is set in its disabled state via the enable (EN) pin 144 in response to the control signal and the gate-controlling unit 128 generates a respective gate control signal which is sent to the switching element 120 such that the switching element 120 closes. The source voltage supplied via the USB plug 102 is now transferred via the first branch 116 of the power supply circuit 106 to the switching voltage regulator 108. The operation of the switching voltage regulator 108 is identical to the operation of the switching voltage regulator 108 when powering-up the powered device 100 as described above.

Figure 2:
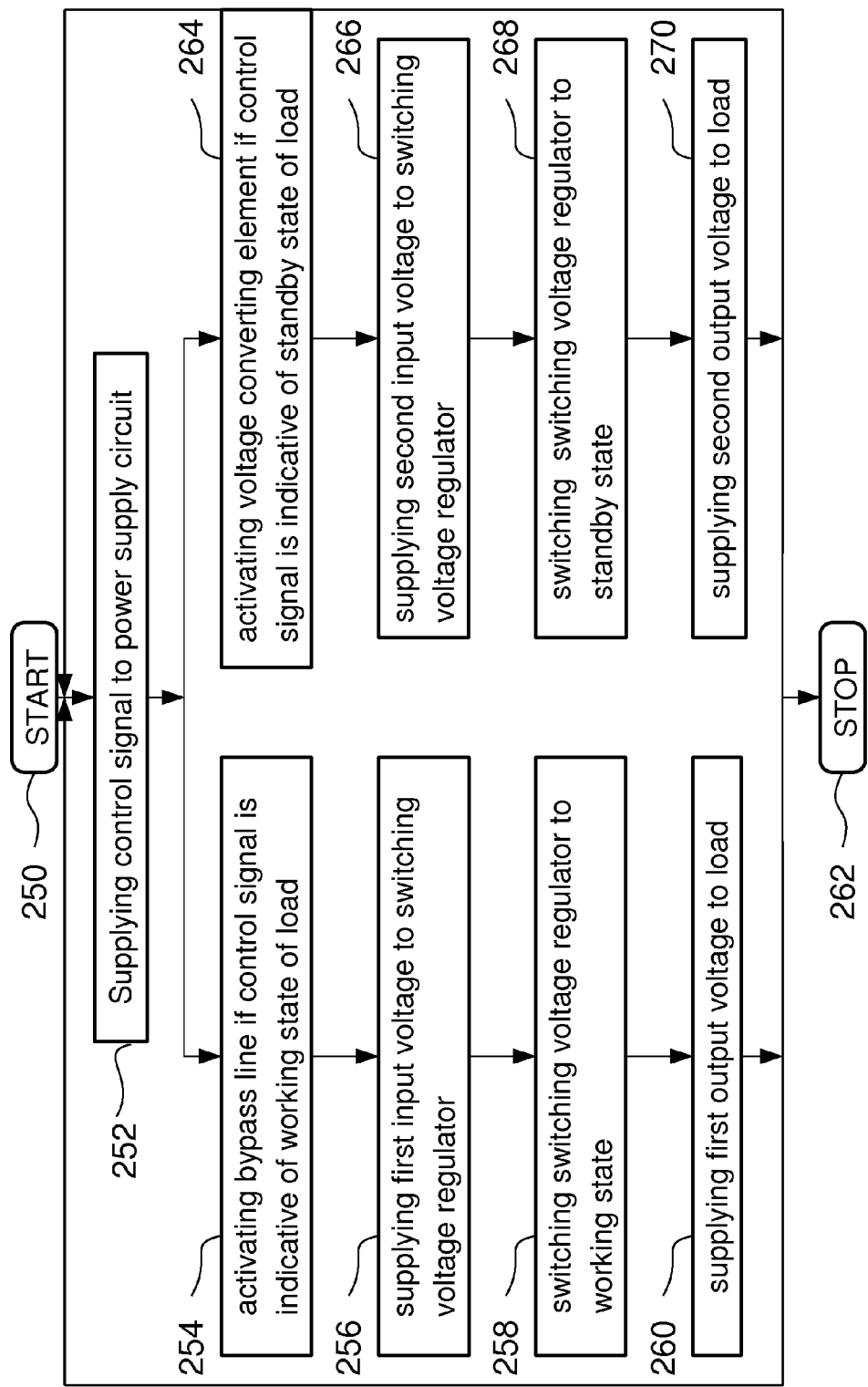
FIG. 2 is a flow chart illustrating a method of managing a power consumption of a switching voltage regulator connectable to a load of the powered device in FIG. 1 according to an exemplary embodiment of the invention.

Referring to FIG. 2 a method of managing a power consumption of the switching voltage regulator 108 connectable to the load 110 according to an exemplary embodiment of the invention will be explained in more detail.

According to a block 250, the method starts. Next, according to a block 252, a control signal is supplied to the power supply circuit 106. According to a block 254, the bypass line 118 is activated by activating the switching element 120, if the control signal is indicative of the working state of the base band chip 111 of the load 110. Further, the voltage converting element 124 is disabled via the enable (EN) pin 144 in response to the control signal. Next, according to a block 256, the first input voltage is supplied to the switching voltage regulator 108 via the closed switching element 120 arranged in the bypass line 118. Next, according to a block 258, the switching voltage regulator 108 switches to its working state, and outputs the down-converted first output voltage. In the working state, the switching voltage regulator 108 repeatedly switches the input voltage and outputs the first output voltage in a pulsed way. Next, according to a block 260, the first output voltage of the switching voltage regulator 108 is supplied to the load 110. Next, according to a block 262, the method stops. This is the case when the power supply circuit 106 is turned off by unplugging the LTE-USB-dongle modem 100.

Instead of executing the steps according to the blocks 254-262, a sequence of alternative method steps is as follows: According to a block 264, the voltage converting element 124 is activated via its EN pin 144, if the control signal is indicative of the standby state of the base band chip 111 of the load 110 and accordingly comprises the high value. According to a block 266, the second input voltage is supplied to the switching voltage regulator 108. Next, according to a block 268, the switching voltage regulator 108 is switched to its standby state, and passes through the second input voltage which is identical to its second output voltage. In this standby state, the switching voltage regulator 108 does not repeatedly switch on an off its second input voltage. Next, according to a block 270, the second output voltage is supplied to the load 110. Afterwards, the method stops, as indicated by the block 262.

The method steps according to the blocks 254-260 and according to the blocks 264-270 may be repeated several times before the method stops. Accordingly, the selectively switching between the working state and the standby state of the switching voltage regulator 108 may be repeated several times. It is noted that the steps according to the blocks 254-260 and also the steps according to the blocks 264-270 may be repeated several times during a time period in which the switching voltage regulator comprises its working state and its standby state, respectively.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A power supply circuit comprising:
    a switching voltage regulator connectable to a load, wherein the power supply circuit is configured for selectively supplying the switching voltage regulator with one of a first input voltage and a second input voltage in response to a control signal indicative of an operative state of the load such that the switching voltage regulator is switched between a working state in response to the first input voltage and a standby state in response to the second input voltage,
    a voltage converting element having an input terminal connected to a voltage bus for providing an input voltage to the voltage converting element and having an output terminal electrically connected to an input terminal of the switching voltage regulator, the voltage converting element being configured to convert the input voltage to an output voltage that is output to the switching voltage regulator via the output terminal, wherein a value of the output voltage of the voltage converting element is equal to the second input voltage of the switching voltage regulator,
    a bypass line having a first end connected to the voltage bus and a second end connected to a first terminal of a switching element for electrically connecting the bypass line to said input terminal of the switching voltage regulator, and
    a switch controlling element for opening and closing the switching element based on the control signal, wherein
    the voltage converting element is configured such that it enters a deactivated mode when the control signal indicates a working state of the load,
    the voltage converting element is further configured such that it enters an activated state when the control signal indicates a standby state of the load, wherein when the voltage converting element enters its activated state, the voltage converting element converts the input voltage to the output voltage and outputs the output voltage at its output terminal,
    the switch controlling element is configured such that it operates the switching element so that the bypass line is electrically connected to the input terminal of the switching voltage regulator when the control signal indicates the working state of the load, and
    the switch controlling element is configured such that it operates the switching element so that the bypass line is electrically disconnected from the input terminal of the switching voltage regulator when the control signal indicates the standby state of the load.

2. The power supply circuit according to claim 1, wherein the power supply circuit is connectable to a power source configured for supplying a source voltage, wherein a value of the source voltage is equal to a value of the first input voltage of the switching voltage regulator.

3. The power supply circuit according to claim 1, wherein the voltage converting element is configured as a low-dropout regulator.

4. The power supply circuit according to claim 1, wherein the switching element is a transistor.

5. The power supply circuit according to claim 1, wherein the voltage converting element has an enable terminal for receiving the control signal.

6. A power consumption management circuit for managing a power consumption of a switching voltage regulator connectable to a load, the power consumption management circuit comprising:

the power supply circuit according to claim 1, and the switching voltage regulator connected to the power supply circuit and configured for being switchable between the working state in response to the first input voltage suppliable by the power supply circuit and the standby state in response to the second input voltage suppliable by the power supply circuit.

7. The power consumption management circuit according to claim 6, wherein the switching voltage regulator is configured for repetitively switching an input voltage to an output voltage, if a value of the input voltage of the switching voltage regulator is above a threshold value, wherein a value of the output voltage of the switching voltage regulator is equal or below the threshold value.

8. The power consumption management circuit according to claim 7, wherein a value of an output voltage of a voltage converting element of the power supply circuit is below the threshold value.

9. The power consumption management circuit according to claim 6, wherein the working state of the switching voltage regulator is associated with the switching voltage regulator being configured for repetitively switching an input voltage to an output voltage, and wherein the standby state of the switching voltage regulator is associated with the switching voltage regulator being configured for passing through the input voltage of the switching voltage regulator.

10. The power consumption management circuit according to claim 6, wherein the power consumption management circuit is an integrated circuit.

11. A powered device, the powered device comprising:

the power consumption management circuit according to claim 6, and the load connected to the switching voltage regulator of the power consumption management circuit.

12. The powered device according to claim 11, wherein the powered device is configured as a mobile telecommunications device and/or according to a Universal Serial Bus specification.

* * * * *